US012619532B2

(12) United States Patent
Tsuchie et al.

(10) Patent No.: US 12,619,532 B2
(45) Date of Patent: May 5, 2026

(54) VEHICLE INFORMATION COLLECTION APPARATUS AND VEHICLE INFORMATION COLLECTION SYSTEM

(71) Applicant: Honda Motor Co., Ltd., Tokyo (JP)

(72) Inventors: Ryuichi Tsuchie, Tokyo (JP); Hiroyuki Tanabe, Tokyo (JP); Kostas Petrikas, Tokyo (JP); Yusuke Oishi, Tokyo (JP); Luiz Guilherme Mesquita Kimel dos Santos, Tokyo (JP); Joao Felipe Santiago dos Santos Orui, Tokyo (JP)

(73) Assignee: Honda Motor Co., Ltd., Tokyo (JP)

( * ) Notice: Subject to any disclaimer, the term of this patent is extended or adjusted under 35 U.S.C. 154(b) by 6 days.

(21) Appl. No.: 18/964,040

(22) Filed: Nov. 29, 2024

(65) Prior Publication Data

US 2025/0181500 A1     Jun. 5, 2025

(30) Foreign Application Priority Data

Dec. 5, 2023     (JP) ................................. 2023-205489

(51) Int. Cl.
*G06F 12/02*          (2006.01)
*G06F 3/06*           (2006.01)
(52) U.S. Cl.
CPC ........ *G06F 12/0246* (2013.01); *G06F 3/0616* (2013.01); *G06F 3/0653* (2013.01); *G06F 3/0679* (2013.01)
(58) Field of Classification Search
CPC .... G06F 3/0616; G06F 3/0653; G06F 3/0679; G06F 2212/1036; G06F 2212/7205;
(Continued)

(56) References Cited

U.S. PATENT DOCUMENTS 11,061,768 B1 * 7/2021 Alrod .................. G06F 11/3037
2014/0068158 A1 * 3/2014 Cheng .................... G11C 29/82
                                                                711/103
(Continued)

FOREIGN PATENT DOCUMENTS

CN       116321156 A  * 6/2023  ............ H04W 12/06
JP       2009230660 A     10/2009
(Continued)

*Primary Examiner* — Curtis James Kortman
(74) *Attorney, Agent, or Firm* — Duft & Bornsen, PC

(57)          ABSTRACT

Vehicle information collection apparatus, includes: processor and memory. Processor is configured to: acquire identification information of vehicle and usage information regarding usage status of in-vehicle equipment from in-vehicle equipment, in-vehicle equipment incorporating flash memory and being associated with identification information. Memory is configured to store identification information. Processor is further configured to: determine whether identification information has been acquired for first time based on identification information stored, generate first-acquisition time information when identification information is determined to have been acquired for first time, first-acquisition time information being information of first acquisition time at which identification information has been acquired for first time, and determine whether to permit writing of usage information into flash memory based on length of collection period and first-acquisition time information, collection period being period for collecting usage information and being determined in advance according to model of vehicle or in-vehicle equipment.

10 Claims, 3 Drawing Sheets

(58) Field of Classification Search
CPC .. G06F 12/0246; G06F 12/0253; G06F 18/22;
G06F 18/2411; G06F 18/10; G06F 18/25;
G06F 18/251; G06F 18/253; G06F
9/4482; G06F 16/215; G06F 16/535;
G06F 21/32; G11C 16/349; G11C
16/1659; G11C 16/0483; G11C 16/10;
G11C 16/32; G11C 2029/5002; G11C
2211/5641; G11C 29/42; G11C 29/52
See application file for complete search history.

(56) References Cited

U.S. PATENT DOCUMENTS

2014/0173268 A1 * 6/2014 Hashimoto ........... G06F 3/0659
713/2
2020/0379861 A1 * 12/2020 Park .................... G06F 12/0246
2020/0401514 A1 * 12/2020 Liang ................. G06F 12/0253

FOREIGN PATENT DOCUMENTS

JP          2009250811 A  * 10/2009
JP          2024095063 A  *  7/2024

* cited by examiner

START

S1

FIRST-ACQUISITION
TIME INFORMATION
STORED?

YES

NO

S2

REQUEST FIRST-ACQUISITION
TIME INFORMATION

S3

WRITE DETERMINATION
PROCESSING

END

START

S10

STORED VIN?

YES

NO

S11

USAGE
INFORMATION
ACQUIRED?

YES

NO

S12

GENERATE FIRST-ACQUISITION
TIME INFORMATION

S13

OUTPUT FIRST-ACQUISITION
TIME INFORMATION

S14

OUTPUT WARNING
INFORMATION

END

VEHICLE INFORMATION COLLECTION APPARATUS AND VEHICLE INFORMATION COLLECTION SYSTEM

CROSS-REFERENCE TO RELATED APPLICATION

This application is based upon and claims the benefit of priority from Japanese Patent Application No. 2023-205489 filed on Dec. 5, 2023, the content of which is incorporated herein by reference.

BACKGROUND OF THE INVENTION

Field of the Invention

The present invention relates to a vehicle information collection apparatus and a vehicle information collection system that incorporate a flash memory and collect information regarding a usage status of in-vehicle equipment associated with identification information of a vehicle.

Description of the Related Art

Conventionally, a device configured to collect information from equipment having a flash memory is known. For example, a device described in JP 2009-230660 A receives and accumulates actual life information from a plurality of computer terminal devices each using a flash memory as a main storage device via a communication line, and predicts the number of days until the flash memory of each terminal device reaches an end-of-life failure. In each terminal device, one substitute block is allocated when one block reaches the end of life, and each terminal device detects and stores the number of remaining substitute blocks, and outputs, as the actual life information, information from when a substitute block is newly allocated until when a substitute block is newly allocated next.

However, in the device described in JP 2009-230660 A, when a substitute block is newly allocated, information on the number of remaining substitute blocks is unconditionally stored in each terminal device, and thus, there is a possibility that an excessive load is applied to the flash memory included in each terminal device.

SUMMARY OF THE INVENTION

An aspect of the present invention is a vehicle information collection apparatus, including: a processor and a memory coupled to the processor. The processor is configured to: acquire identification information of a vehicle and usage information regarding a usage status of an in-vehicle equipment from the in-vehicle equipment, the in-vehicle equipment incorporating a flash memory and being associated with the identification information. The memory is configured to: store the identification information acquired by the processor. The processor is further configured to: determine whether the identification information has been acquired for the first time based on the identification information stored in the memory; generate first-acquisition time information when it is determined that the identification information has been acquired for the first time, the first-acquisition time information being information of a first acquisition time at which the identification information has been acquired for the first time; and determine whether to permit writing of the usage information into the flash memory based on a length of a collection period and the first-acquisition time information, the collection period being a period for collecting the usage information and being determined in advance according to a model of the vehicle or the in-vehicle equipment.

Another aspect of the present invention is a vehicle information collection system, including: an in-vehicle equipment incorporating a flash memory and being associated with identification information of a vehicle; and a server configured to be able to communicate with the in-vehicle equipment through the Internet. The server is configured to: acquire the identification information and usage information regarding a usage status of the in-vehicle equipment from the in-vehicle equipment; store the identification information acquired; determine whether the identification information has been acquired for the first time based on the identification information stored; generate first-acquisition time information when it is determined that the identification information has been acquired for the first time, the first-acquisition time information being information of a first acquisition time at which the identification information has been acquired for the first time; and output the first-acquisition time information generated to the in-vehicle equipment. The in-vehicle equipment is configured to determine whether to permit writing of the usage information into the flash memory based on a length of a collection period and the first-acquisition time information outputted by the server, the collection period being a period for collecting the usage information and being determined in advance according to a model of the vehicle or the in-vehicle equipment.

BRIEF DESCRIPTION OF THE DRAWINGS

The objects, features, and advantages of the present invention will become clearer from the following description of embodiments in relation to the attached drawings, in which.

DETAILED DESCRIPTION OF THE INVENTION

Hereinafter, an embodiment of the present invention will be described with reference to FIGS. 1 to 5. In recent years, a vehicle that communicates with surrounding vehicles, infrastructure facilities, cloud servers, and the like via the Internet, so-called a connected car, has become widespread. In addition, an in-vehicle infotainment (IVI) system which is mounted on the connected car and provides various information contents and entertainment contents according to an operation by a user has become widespread. Such an IVI system is provided via in-vehicle equipment having a wireless communication function. A user interface is displayed on the display of the in-vehicle equipment by an application program installed in advance, and the user operates the user interface via an operation unit such as a touch panel, whereby the content corresponding to the user operation is provided.

In such an IVI system, by collecting, analyzing, and interpreting information (usage information), which includes the information of the user operation, regarding the usage status of the in-vehicle equipment, it is possible to review the specification or the like of the user interface and improve the application program. However, it is necessary to write a large amount of data including image information having a relatively large capacity in the flash memory incorporated in the in-vehicle equipment in order to collect the usage information of the in-vehicle equipment, so that an excessive load is applied to the flash memory, and a product life may be shortened. That is, the tunnel oxide insulating film of the flash memory is gradually deteriorated by repeated writing and erasing of data, and reaches the end of life by writing and erasing normally about 1,000 times to 10,000 times. In this regard, in the present embodiment, the vehicle information collection apparatus is configured as follows such that the usage information of the in-vehicle equipment can be collected without applying an excessive load to the flash memory.

Figure 1:
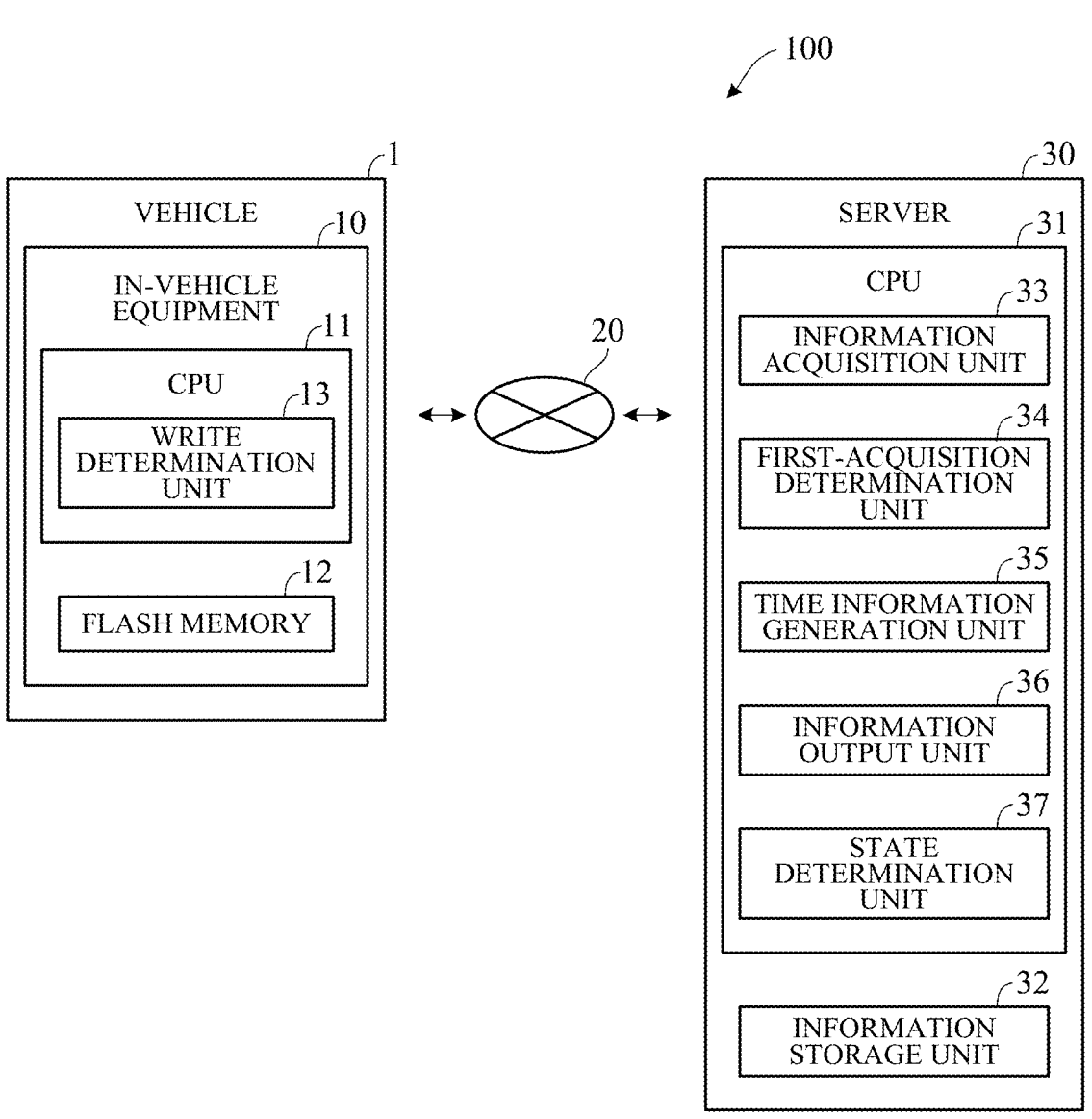
FIG. 1 is a block diagram illustrating an example of a configuration of a vehicle information collection apparatus according to an embodiment of the present invention.

FIG. 1 is a block diagram illustrating an example of a configuration of a vehicle information collection apparatus according to an embodiment of the present invention, and illustrates an example of a configuration of a vehicle information collection system 100 which is a vehicle information collection apparatus. As illustrated in FIG. 1, the vehicle information collection system 100 includes in-vehicle equipment 10 mounted on a vehicle 1 and a server 30 configured to be able to communicate with the in-vehicle equipment 10 via the Internet 20.

The in-vehicle equipment 10 includes a computer including a central processing unit (processor) 11 as a central processing unit, a memory such as a ROM and a RAM as a main storage device, a flash memory 12 as an auxiliary storage device, an I/O interface, and other peripheral circuits. Identification information (for example, a vehicle identification number (VIN)) of the vehicle 1 is associated with the in-vehicle equipment 10, and the identification information of the vehicle 1 is stored in the ROM of the in-vehicle equipment 10 in a non-rewritable manner. The in-vehicle equipment 10 includes, as a functional component, a write determination unit 13 that determines whether or not to permit writing of the usage information of the in-vehicle equipment 10 to the flash memory 12. That is, the CPU 11 of the in-vehicle equipment 10 functions as the write determination unit 13.

The server 30 is a management server that collects and manages the usage information of the in-vehicle equipment 10, and includes a computer including a CPU (processor) 31, a memory such as a ROM and a RAM, an I/O interface, and other peripheral circuits. The server 30 may be configured using a virtual server function on a cloud, or may be configured to be distributed to a plurality of terminals. The server 30 includes, as functional components, an information storage unit 32, an information acquisition unit 33, a first-acquisition determination unit 34, a time information generation unit 35, an information output unit 36, and a state determination unit 37. That is, the memory of the server 30 functions as the information storage unit 32, and the CPU 31 of the server 30 functions as the information acquisition unit 33, the first-acquisition determination unit 34, the time information generation unit 35, the information output unit 36, and the state determination unit 37.

When activated, the in-vehicle equipment 10 accesses the server 30 via the Internet 20. At this time, the identification information of the vehicle 1 is transmitted from the in-vehicle equipment 10 to the server 30. The information acquisition unit 33 of the server 30 acquires the identification information of the vehicle 1 transmitted from the in-vehicle equipment 10, and stores the identification information in the information storage unit 32. More specifically, when acquiring VIN that is the identification information of the vehicle 1, the information acquisition unit 33 generates a hash value corresponding to the acquired VIN by using a predetermined hash function, and stores the generated hash value as the identification information of the vehicle 1 in the information storage unit 32.

The first-acquisition determination unit 34 of the server 30 determines whether or not the identification information is acquired for the first time by the information acquisition unit 33, on the basis of the identification information stored in the information storage unit 32. More specifically, the first-acquisition determination unit 34 determines whether or not the hash value newly generated by the information acquisition unit 33 matches the hash value already stored in the information storage unit 32. When the newly generated hash value does not match the hash value stored in the information storage unit 32, it is determined that the identification information is acquired for the first time. When the newly generated hash value matches the hash value stored in the information storage unit 32, it is determined that the identification information is not acquired for the first time, that is, the second or subsequent time.

When the first-acquisition determination unit 34 determines that the identification information has been acquired for the first time, the time information generation unit 35 generates first-acquisition time information that is information (time stamp) of a first acquisition time tf at which the identification information has been acquired for the first time by the information acquisition unit 33. The first-acquisition time information generated by the time information generation unit 35 is associated with the identification information (the hash value of VIN) of the vehicle 1 and stored in the information storage unit 32. The first-acquisition time information stored in the information storage unit 32 is protected in a non-rewritable manner.

The information output unit 36 transmits, to the in-vehicle equipment 10, the first-acquisition time information generated by the time information generation unit 35. More specifically, when the identification information of the vehicle 1 is acquired for the first time, the newly generated first-acquisition time information is immediately transmitted to the in-vehicle equipment 10, and when the identification information is acquired for the second and subsequent times, the first-acquisition time information stored in the information storage unit 32 is read and transmitted to the in-vehicle equipment 10.

The first-acquisition time information transmitted from the information output unit 36 of the server 30 to the in-vehicle equipment 10 is stored in the flash memory 12 of the in-vehicle equipment 10. The first-acquisition time information stored in the flash memory 12, which is a nonvolatile memory, is maintained even when the power to the vehicle 1 and the in-vehicle equipment 10 is cut off, but is erased when the in-vehicle equipment 10 is initialized or reset. For example, when a user of the vehicle 1 is changed, the in-vehicle equipment 10 is initialized or reset, and the personal information including the first-acquisition time information stored in the flash memory 12 is erased.

The write determination unit 13 of the in-vehicle equipment 10 determines whether or not to permit writing of the usage information to the flash memory 12, on the basis of the first-acquisition time information stored in the flash memory 12 and a predetermined length of a collection period T1 for collecting the usage information. The collection period T1 is a period for collecting usage information necessary for improving the application of the in-vehicle equipment 10, and is determined in advance as a period of about 3 years, for example, in consideration of a period required for responding to an initial trouble, a support period, and the like according to the model of the vehicle 1 or the in-vehicle equipment 10. That is, the usage information is written and erased in addition to the normal use of the flash memory 12, so that the product life of the flash memory is determined in advance as a minimum necessary period so as not to be extremely shorter than the product life of the vehicle 1. The information of the length of the collection period T1 is stored in the ROM of the in-vehicle equipment 10.

The write determination unit 13 permits writing of the usage information into the flash memory 12 until the collection period T1 elapses from the first acquisition time tf, and prohibits writing of the usage information into the flash memory 12 after the collection period T1 elapses from the first acquisition time tf. More specifically, when a current time tc has not reached a collection end time (tf+T1) obtained by adding the collection period T1 to the first acquisition time tf, writing of the usage information into the flash memory 12 is permitted. On the other hand, when the current time tc has reached the collection end time (tf+T1), writing of the usage information to the flash memory 12 is prohibited.

The write determination unit 13 may permit writing of the usage information to the flash memory 12 until the collection period T1 elapses from a reference time to, and prohibit writing of the usage information to the flash memory 12 after the collection period T1 elapses from the reference time t0. The reference time t0 is a predetermined time point determined in advance according to the model of the vehicle 1 or the in-vehicle equipment 10, and is determined in advance according to, for example, the launch date (release date) of a specific model. The information of the reference time t0 is stored in the ROM of the in-vehicle equipment 10.

In this case, the write determination unit 13 calculates the length (T2=T1−(tf−t0)) of an individual collection period T2 for collecting the usage information by subtracting the length (tf−t0) of the period from the reference time t0 to the first acquisition time tf from the length of the collection period T1. The write determination unit 13 permits writing of the usage information into the flash memory 12 until the individual collection period T2 elapses from the first acquisition time tf, and prohibits writing of the usage information into the flash memory 12 after the individual collection period T2 elapses from the first acquisition time tf. More specifically, when the current time tc has not reached a collection end time (tf+T2) obtained by adding the individual collection period T2 to the first acquisition time tf, writing of the usage information into the flash memory 12 is permitted. On the other hand, when the current time tc has reached the collection end time (tf+T2), writing of the usage information to the flash memory 12 is prohibited.

When writing of the usage information to the flash memory 12 is permitted, the usage information is written and accumulated in the flash memory 12, for example, each time a user operation is performed on the in-vehicle equipment 10. The usage information in this case includes information of a screen of the user interface displayed on the display of the in-vehicle equipment 10 at a time point when the user operation is performed, information of a coordinate position on the screen where the user operation is performed, and the like. The usage information accumulated in the flash memory 12 is transmitted to the server 30 at a predetermined cycle (for example, once every 24 hours or every activation of the in-vehicle equipment 10) together with the identification information of the vehicle 1, and is erased from the flash memory 12.

The information acquisition unit 33 of the server 30 acquires the identification information of the vehicle 1 and the usage information of the in-vehicle equipment 10 transmitted from the in-vehicle equipment 10, and stores the acquired information in the information storage unit 32. More specifically, the information acquisition unit 33 stores the usage information of the in-vehicle equipment 10 in the information storage unit 32 in association with the identification information (the hash value of VIN) of the vehicle 1. As a result, the usage information of the in-vehicle equipment 10 is collected and managed on the server 30 side.

On the in-vehicle equipment 10 side, writing of the usage information into the flash memory 12 is prohibited in an initial state. Therefore, in a case where the first-acquisition time information is not stored in the flash memory 12, the write determination unit 13 of the in-vehicle equipment 10 prohibits writing of the usage information to the flash memory 12. For example, writing of the usage information to the flash memory 12 is prohibited in a period before the in-vehicle equipment 10 accesses the server 30 for the first time or a period before the in-vehicle equipment 10 accesses the server 30 after being initialized or reset. When writing of the usage information into the flash memory 12 is prohibited on the in-vehicle equipment 10 side, the usage information of the in-vehicle equipment 10 is not transmitted to the server 30, and the usage information of the in-vehicle equipment 10 cannot be collected and managed on the server 30 side.

Note that when the in-vehicle equipment 10 accesses the server 30 for the first time after being initialized or reset, information indicating that the in-vehicle equipment 10 is initialized or reset is transmitted from the in-vehicle equipment 10 to the server 30 together with the identification information of the vehicle 1. As a result, on the server 30 side, the usage information collected before the initialization or the reset of the in-vehicle equipment 10 and the usage information collected later can be managed as the usage information by different users. In this case, the accuracy of analysis and interpretation of the collected usage information can be improved.

When the first-acquisition determination unit 34 determines that the identification information is acquired for the first time, the state determination unit 37 of the server 30 determines whether or not the usage information is acquired by the information acquisition unit 33, in other words, whether or not the usage information acquired by the information acquisition unit 33 is a predetermined amount or more. That is, when the identification information of the vehicle 1 is acquired for the first time on the server 30 side, the first-acquisition time information of the vehicle 1 has not yet been generated, and thus, writing and collection of the usage information on the in-vehicle equipment 10 side are prohibited. Nevertheless, in a case where the usage information of the in-vehicle equipment 10 is acquired by the information acquisition unit 33, there is a possibility that the identification information of the vehicle 1 is falsified. When the state determination unit 37 determines that the usage information acquired by the information acquisition unit 33 is the predetermined amount or more, the information output unit 36 outputs warning information indicating that there is a possibility that the identification information of the vehicle 1 has been falsified.

Figure 2:
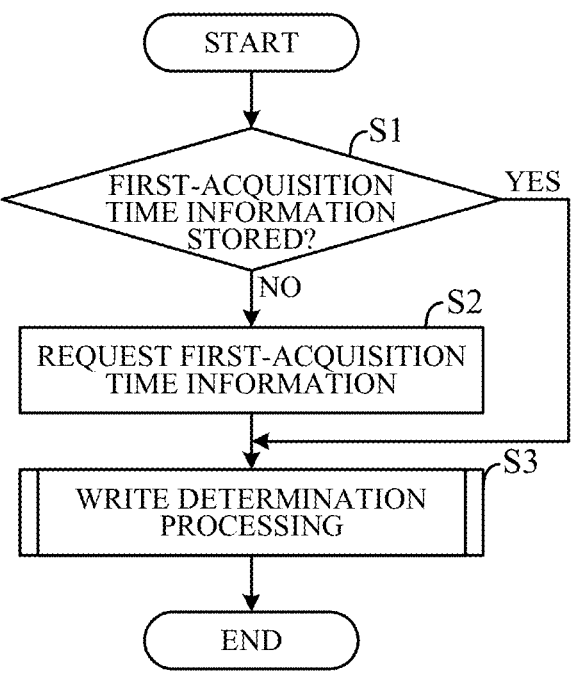
FIG. 2 is a flowchart illustrating an example of processing executed on an in-vehicle equipment side in FIG. 1.

FIG. 2 is a flowchart illustrating an example of processing executed by the CPU 11 of the in-vehicle equipment 10 according to a program stored in advance in the memory of the in-vehicle equipment 10. The processing illustrated in this flowchart is started, for example, when the vehicle 1 and the in-vehicle equipment 10 are activated. As illustrated in FIG. 2, first, in S1 (S: processing step), it is determined whether or not first-acquisition time information is stored in the flash memory 12. If the determination is negative in S1, the processing proceeds to S2, and if the determination is positive in S1, the processing proceeds to S3. In S2, the identification information of the vehicle 1 is transmitted to the server 30 to request the first-acquisition time information. When the in-vehicle equipment 10 and the server 30 are connected via the Internet 20, the first-acquisition time information is transmitted from the server 30 to the in-vehicle equipment 10 in response to the request, and is stored in the flash memory 12 of the in-vehicle equipment 10. When the in-vehicle equipment 10 and the server 30 are not connected, the first-acquisition time information is not stored in the flash memory 12 of the in-vehicle equipment 10. In S3, write determination processing (FIGS. 4 and 5) is performed.

Figure 3:
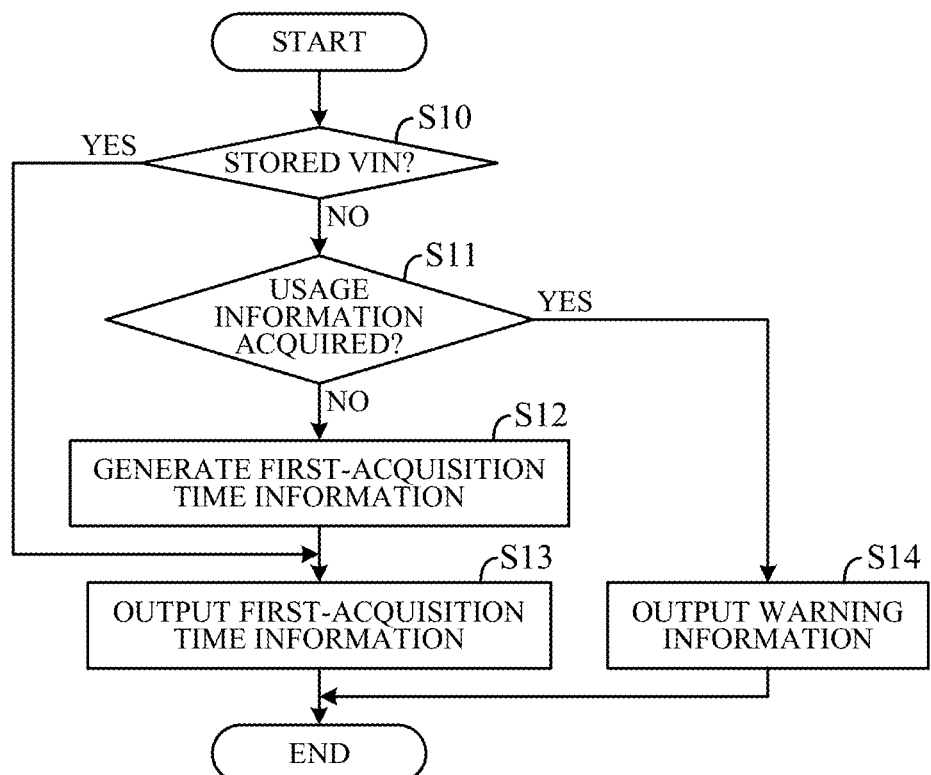
FIG. 3 is a flowchart illustrating an example of time information generation processing executed on a side of a server side in FIG. 1.

FIG. 3 is a flowchart illustrating an example of time information generation processing executed by the CPU 31 on the server 30 side according to a program stored in advance in the memory of the server 30. The processing illustrated in the flowchart is executed every time the identification information of the vehicle 1 is transmitted from the in-vehicle equipment 10 to the server 30. As illustrated in FIG. 3, first, in S10, a hash value corresponding to the acquired identification information is generated, and it is determined whether or not the generated hash value matches the hash value stored in the information storage unit 32. If the determination is negative in S10, it is determined that new identification information is acquired, and the processing proceeds to S11, and if the determination is affirmative in S10, it is determined that existing identification information is acquired, and the processing proceeds to S13.

In S11, it is determined whether or not the usage information of the in-vehicle equipment 10 is acquired together with the identification information of the vehicle 1, in other words, whether or not the usage information acquired together with the new identification information is a predetermined amount or more. If the determination is negative in S11, the processing proceeds to S12, and if the determination is positive in S11, the processing proceeds to S14. In S12, first-acquisition time information of the first acquisition time tf at which the new identification information is acquired is generated and stored in the information storage unit 32. In S13, the first-acquisition time information stored in the information storage unit 32 is read and transmitted to the in-vehicle equipment 10. In S14, warning information indicating that there is a possibility that the identification information of the vehicle 1 has been falsified is output.

Figure 4:
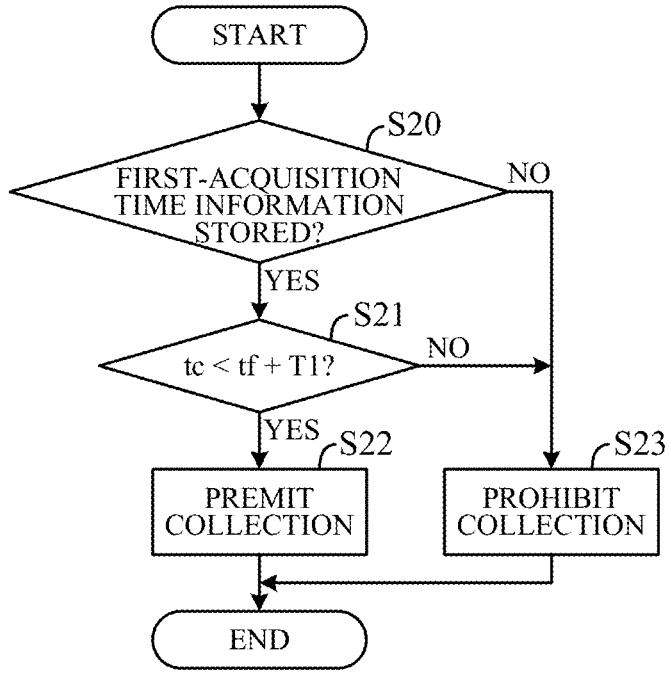
FIG. 4 is a flowchart illustrating an example of write determination processing executed on the in-vehicle equipment side in FIG. 1.
Figure 5:
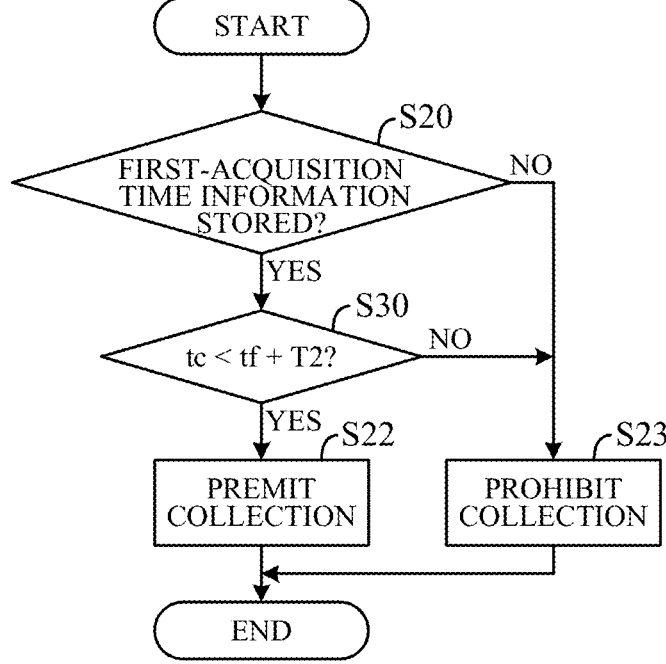
FIG. 5 is a flowchart illustrating another example of the write determination processing executed on the in-vehicle equipment side in FIG. 1.

FIGS. 4 and 5 are flowcharts illustrating an example of the write determination processing executed by the CPU 11 of the in-vehicle equipment 10 according to a program stored in advance in the memory of the in-vehicle equipment 10. In the example of FIG. 4, in S20, it is determined whether or not the first-acquisition time information is stored in the flash memory 12. If the determination is affirmative in S20, the processing proceeds to S21. On the other hand, if the determination is negative in S20, it is determined that it is an initial state, and the processing proceeds to S23. In S21, it is determined whether or not the current time tc has not reached the collection end time (tf+T1) obtained by adding the collection period T1 to the first acquisition time tf. If the determination is affirmative in S21, the processing proceeds to S22, and writing of the usage information to the flash memory 12 is permitted. On the other hand, if the determination is negative in S21, the processing proceeds to S23, and writing of the usage information to the flash memory 12 is prohibited.

In the example of FIG. 5, instead of S21 of FIG. 4, it is determined in S30 whether or not the current time tc has not reached the collection end time (tf+T2) obtained by adding the individual collection period T2 to the first acquisition time tf. If the determination is affirmative in S30, the processing proceeds to S22, and writing of the usage information to the flash memory 12 is permitted. On the other hand, if the determination is negative in S30, the processing proceeds to S23, and writing of the usage information to the flash memory 12 is prohibited.

As described above, the period during which the usage information of the in-vehicle equipment 10 is written in the flash memory 12 is limited to a minimum necessary period (S20 to S23, S30), so that the usage information of the in-vehicle equipment 10 can be collected without applying an excessive load to the flash memory 12. In addition, the first-acquisition time information of the first acquisition time tf, which is a premise that writing of the usage information to the flash memory 12 is permitted, is generated on the server 30 side and protected in a non-rewritable manner (S1 to S3, S10 to S13, and S20), whereby the collection period can be reliably managed. In particular, even in a case where the in-vehicle equipment 10 is initialized or reset after writing of the usage information to the flash memory 12 is permitted, the collection period can be reliably managed. In addition, since the first-acquisition time information generated on the server 30 side is also stored on the in-vehicle equipment 10 side, the collection period can be managed on the in-vehicle equipment 10 side even when the connection with the server 30 is not established (S20 to S23, and S30).

According to the present embodiment, the following operations and effects can be achieved.

(1) The vehicle information collection system 100 which is a vehicle information collection apparatus includes the in-vehicle equipment 10 that incorporates the flash memory 12 and is associated with identification information of the vehicle 1, and the server 30 which is configured to be able to communicate with the in-vehicle equipment 10 via the Internet 20 (FIG. 1). The server 30 includes the information acquisition unit 33 that acquires, from the in-vehicle equipment 10, identification information of the vehicle 1 and usage information regarding a usage status of the in-vehicle equipment 10, the information storage unit 32 that stores the identification information acquired by the information acquisition unit 33, the first-acquisition determination unit 34 that determines whether or not the identification information has been acquired for the first time by the information acquisition unit 33, on the basis of the identification information stored in the information storage unit 32, the time information generation unit 35 that generates first-acquisition time information that is information of a first acquisition time tf at which the identification information has been acquired for the first time by the information acquisition unit 33 when the first-acquisition determination unit 34 determines that the identification information has been acquired for the first time by the information acquisition unit 33, and the information output unit 36 that outputs the first-acquisition time information generated by the time information generation unit 35 to the in-vehicle equipment 10 (FIGS. 1 and 3). The in-vehicle equipment 10 includes the write determination unit 13 that determines whether or not to permit writing of the usage information into the flash memory 12, on the basis of a length of a collection period T1, which is determined in advance according to a model of the vehicle 1 or the in-vehicle equipment 10, for collecting the usage information and the first-acquisition time information output by the information output unit 36 of the server 30 (FIGS. 1, 4, and 5). As described above, a period during which the usage information of the in-vehicle equipment 10 is written in the flash memory 12 is limited, so that the usage information of the in-vehicle equipment 10 can be collected without applying an excessive load to the flash memory 12.

(2) The write determination unit 13 permits writing of the usage information into the flash memory 12 until the collection period T1 elapses from the first acquisition time tf, and prohibits writing of the usage information into the flash memory 12 after the collection period T1 elapses from the first acquisition time tf (FIG. 4). In this case, the collection period can be managed for each of the vehicle 1 and the in-vehicle equipment 10.

(3) The write determination unit 13 calculates a length of an individual collection period T2 for collecting the usage information by subtracting, from the length of the collection period T1, a length (tf−t0) of a period from the reference time to determined in advance according to a model of the vehicle 1 or the in-vehicle equipment 10 to the first acquisition time tf. The write determination unit 13 permits writing of the usage information into the flash memory 12 until the individual collection period T2 elapses from the first acquisition time tf, and prohibits writing of the usage information into the flash memory 12 after the individual collection period T2 elapses from the first acquisition time tf (FIG. 5). In this case, the collection period can be managed for each model of the vehicle 1 or the in-vehicle equipment 10.

(4) The server 30 further includes the state determination unit 37 that, when the first-acquisition determination unit 34 determines that the identification information has been acquired for the first time by the information acquisition unit 33, determines whether or not the usage information acquired by the information acquisition unit 33 is a predetermined amount or more (FIGS. 1 and 3). When the state determination unit 37 determines that the usage information acquired by the information acquisition unit 33 is equal to or more than the predetermined amount, the information output unit 36 outputs warning information indicating that there is a possibility that the identification information has been falsified (FIG. 3). That is, in a case where usage information that is not expected to be permitted to be collected yet is transmitted from the vehicle 1 to the server 30 together with new identification information, there is a possibility that the identification information of the vehicle 1 has been falsified, and thus, it is possible to take necessary measures by outputting appropriate warning information.

In the above embodiment, an example has been described in which the first-acquisition time information is managed on the server 30 side, and collection end times (tf+T1) and (tf+T2) are calculated and write determination processing is performed on the in-vehicle equipment 10 side. However, a write determination unit may be provided on the server 30 side, and the collection end times may be calculated and the write determination processing may be performed on the server 30 side.

The above embodiment can be combined as desired with one or more of the aforesaid modifications. The modifications can also be combined with one another.

According to the present invention, it becomes possible to collect information regarding a usage status of the in-vehicle equipment without applying an excessive load to the flash memory.

Above, while the present invention has been described with reference to the preferred embodiments thereof, it will be understood, by those skilled in the art, that various changes and modifications may be made thereto without departing from the scope of the appended claims.

The invention claimed is:

1. A vehicle information collection apparatus, comprising:
a processor and a memory coupled to the processor, wherein
the processor is configured to:
acquire identification information of a vehicle and usage information regarding a usage status of an in-vehicle equipment from the in-vehicle equipment, the in-vehicle equipment incorporating a flash memory and being associated with the identification information, wherein
the memory is configured to:
store the identification information acquired by the processor, wherein
the processor is further configured to:
determine whether the identification information has been acquired for the first time based on the identification information stored in the memory;
generate first-acquisition time information when it is determined that the identification information has been acquired for the first time, the first-acquisition time information being information of a first acquisition time at which the identification information has been acquired for the first time; and
determine whether to permit writing of the usage information into the flash memory based on a length of a collection period and the first-acquisition time information, the collection period being a period for collecting the usage information and being determined in advance according to a model of the vehicle or the in-vehicle equipment, wherein
the processor permits writing of the usage information into the flash memory until the collection period elapses from the first acquisition time and prohibits writing of the usage information into the flash memory after the collection period elapses from the first acquisition time.

2. The vehicle information collection apparatus according to claim 1, wherein
the processor is further configured to:
determine whether the usage information acquired is a predetermined amount or more when it is determined that the identification information has been acquired for the first time; and
output warning information indicating that there is a possibility that the identification information has been falsified when it is determined that the usage information acquired is the predetermined amount or more.

3. The vehicle information collection apparatus according to claim 1, wherein the usage information written in the flash memory is acquired and erased from the flash memory at a predetermined cycle, wherein the flash memory is gradually deteriorated by repeated writing and erasing of data.

4. The vehicle information collection apparatus according to claim 1, wherein a user interface is displayed on a display of the in-vehicle equipment, wherein the usage information includes:

information of a screen of the user interface displayed on the display at a time point when a user operation through the user interface is performed; and information of a coordinate position on the screen where the user operation is performed.

5. A vehicle information collection apparatus, comprising:

a processor and a memory coupled to the processor, wherein the processor is configured to:

acquire identification information of a vehicle and usage information regarding a usage status of an in-vehicle equipment from the in-vehicle equipment, the in-vehicle equipment incorporating a flash memory and being associated with the identification information, wherein the memory is configured to:

store the identification information acquired by the processor, wherein the processor is further configured to:

determine whether the identification information has been acquired for the first time based on the identification information stored in the memory;

generate first-acquisition time information when it is determined that the identification information has been acquired for the first time, the first-acquisition time information being information of a first acquisition time at which the identification information has been acquired for the first time; and determine whether to permit writing of the usage information into the flash memory based on a length of a collection period and the first-acquisition time information, the collection period being a period for collecting the usage information and being determined in advance according to a model of the vehicle or the in-vehicle equipment, wherein the processor:

calculates a length of an individual collection period for collecting the usage information by subtracting, from the length of the collection period, a length of a period from a reference time determined in advance according to the model of the vehicle or the in-vehicle equipment to the first acquisition time;

permits writing of the usage information into the flash memory until the individual collection period elapses from the first acquisition time; and prohibits writing of the usage information into the flash memory after the individual collection period elapses from the first acquisition time.

6. The vehicle information collection apparatus according to claim 5, wherein the processor is further configured to:

determine whether the usage information acquired is a predetermined amount or more when it is determined that the identification information has been acquired for the first time; and output warning information indicating that there is a possibility that the identification information has been falsified when it is determined that the usage information acquired is the predetermined amount or more.

7. The vehicle information collection apparatus according to claim 5, wherein the usage information written in the flash memory is acquired and erased from the flash memory at a predetermined cycle, wherein the flash memory is gradually deteriorated by repeated writing and erasing of data.

8. The vehicle information collection apparatus according to claim 5, wherein a user interface is displayed on a display of the in-vehicle equipment, wherein the usage information includes:

information of a screen of the user interface displayed on the display at a time point when a user operation through the user interface is performed; and information of a coordinate position on the screen where the user operation is performed.

9. A vehicle information collection system, comprising:

an in-vehicle equipment incorporating a flash memory and being associated with identification information of a vehicle; and a server configured to be able to communicate with the in-vehicle equipment through the Internet, wherein the server is configured to:

acquire the identification information and usage information regarding a usage status of the in-vehicle equipment from the in-vehicle equipment;

store the identification information acquired;

determine whether the identification information has been acquired for the first time based on the identification information stored;

generate first-acquisition time information when it is determined that the identification information has been acquired for the first time, the first-acquisition time information being information of a first acquisition time at which the identification information has been acquired for the first time; and output the first-acquisition time information generated to the in-vehicle equipment, wherein the in-vehicle equipment is configured to determine whether to permit writing of the usage information into the flash memory based on a length of a collection period and the first-acquisition time information outputted by the server, the collection period being a period for collecting the usage information and being determined in advance according to a model of the vehicle or the in-vehicle equipment, wherein the in-vehicle equipment permits writing of the usage information into the flash memory until the collection period elapses from the first acquisition time and prohibits writing of the usage information into the flash memory after the collection period elapses from the first acquisition time.

10. The vehicle information collection system according to claim 9, wherein writing of the usage information into the flash memory is prohibited in a period before the in-vehicle equipment accesses the server for the first time and a period before the in-vehicle equipment accesses the server after being initialized or reset.

* * * * *